United States Patent [19]
Ishida et al.

[11] Patent Number: 5,334,413
[45] Date of Patent: Aug. 2, 1994

[54] METHOD FOR PREPARING A MAGNETIC RECORDING MEDIUM

[75] Inventors: Toshio Ishida; Yasuo Nishikawa; Tadashi Yasunaga, all of Kanagawa, Japan

[73] Assignee: Fuji Photo Film Co., Ltd., Kanagawa, Japan

[21] Appl. No.: 978,520

[22] Filed: Nov. 18, 1992

[30] Foreign Application Priority Data

Nov. 19, 1991 [JP] Japan ................... 3-303129

[51] Int. Cl.$^5$ ............................................. B05D 5/12
[52] U.S. Cl. ................................. 427/130; 427/131; 427/132; 427/250; 427/255.3; 427/404; 427/407.1
[58] Field of Search ............... 427/130, 131, 132, 250, 427/404, 407.1, 255.3

[56] References Cited

U.S. PATENT DOCUMENTS

3,778,308 12/1973 Roller ................................. 117/234
4,940,606 7/1990 Hilgers et al. ...................... 427/130

FOREIGN PATENT DOCUMENTS

3-207019 9/1991 Japan .

Primary Examiner—Bernard Pianalto
Attorney, Agent, or Firm—Sughrue, Mion, Zinn, Macpeak & Seas

[57] ABSTRACT

A ferromagnetic thin metal film type magnetic recording medium is disclosed, comprising a non-magnetic support having thereon a ferromagnetic thin metal film, wherein a perfluoropolyether having at least one polar group having the saturation adsorption amount (mg/m$^2$) of at least 4.0 mg/m$^2$ against the ferromagnetic thin metal film is coated or applied onto the surface of the ferromagnetic thin metal film. There is also disclosed a method for preparing a ferromagnetic thin metal film type magnetic recording medium comprising forming a ferromagnetic thin metal film, subjecting the ferro-magnetic thin metal film to a treatment with oxygen gas, ozone gas, a heat treatment or a treatment with an inert gas, and then applying a perfluoropolyether having at least one polar group to the ferromagnetic thin metal film.

6 Claims, 6 Drawing Sheets

METHOD FOR PREPARING A MAGNETIC RECORDING MEDIUM

FIELD OF THE INVENTION

This invention relates to a ferromagnetic thin metal film type magnetic recording medium for high density recording having excellent electromagnetic characteristics. More particularly, it relates to a magnetic recording medium having improved corrosion resistance and having both excellent running properties and abrasion resistance over wider temperature and humidity conditions and over wider recording and reproducing conditions ranging from low to high speed.

BACKGROUND OF TEE INVENTION

Ferromagnetic thin metal film type magnetic recording mediums comprising a support having thereon a magnetic layer of a ferromagnetic thin metal film formed by vacuum film-forming methods such as a vacuum evaporation method, sputtering process, ion plating process, etc., have excellent electromagnetic characteristics in comparison with coated type magnetic recording mediums having a magnetic layer composed mainly of a ferromagnetic powder and a binder resin because the magnetic layer of the ferromagnetic thin metal film does not contain any binder resin. Accordingly, the ferromagnetic thin metal film type recording mediums are drawing attention as magnetic recording mediums for high-density recording and may be put to practical use.

Particularly, the vacuum evaporation method has advantages in that the method is a dry treatment system, the film forming rate is high, and the manufacturing process is relatively simple in comparison with other film forming methods under vacuum. Various proposals have been made for a long time to improve the ferromagnetic thin metal film type magnetic recording mediums prepared by the vacuum evaporation method. For example, such proposals are described in U.S. Pat. No. 3,342,632 and 3,342,633.

The ferromagnetic thin metal film type recording mediums have serious practical problems in regard to running properties, durability and corrosion resistance.

A magnetic recording medium and a magnetic head slide at a high speed when they are brought into contact with each other during the course of recording, reproduction and erasing of signals during magnetic recording. During these operations, it is required that the magnetic layer of the magnetic recording medium is not abraded and broken. That is, the magnetic layer is run smoothly and stably.

JP-A-60-69824 (the term "JP-A", as used herein, means an "unexamined published Japanese patent application") and JP-A-60-85427 disclose a method wherein a layer containing a thermoplastic resin, a thermosetting resin, a fatty acid, a metal salt of a fatty acid, a fatty acid ester or an alkylphosphoric ester as a lubricating layer or a protective layer for the magnetic layer of the ferromagnetic thin metal film type recording medium is formed on the surface of the magnetic layer to meet the above requirements.

Many methods using fluorine-containing compounds as a material for the protective layer have been proposed. For example, JP-A-61-107528 discloses that compounds having a branched perfluoroalkenyl group are used to improve durability. U.S. Pat. No. 3,778,308 discloses a method using perfluoroalkyl polyether compounds.

JP-B-60-10368 (the term "JP-B", as used herein, means an "examined Japanese patent publication") discloses a method wherein perfluoroalkyl polyether compounds having modified terminal groups obtained by modifying one or both terminals of a perfluoroalkyl polyether molecular chain with a polar group such as a carboxyl group are used as compounds for the protective layer.

The use of multi-chain perfluoroalkyl polyether amides obtained by the dehydration-condensation of a compound having two or more amino groups with a carboxylic acid having a perfluoroalkyl polyether chain as a lubricant for disc type ferromagnetic thin metal film type magnetic recording mediums has been disclosed (Sugiyama, et al., Proceedings (page 425) of the 34th All Japan Meeting of the Lubricant Society of Japan, B.28).

Further, JP-A-64-33713, JP-A-1-112516, JP-A-3-102614, JP-A-1-112528 and JP-A-62-192029 disclose that compounds having a polar group such as an isocyanato group or an oxo acid group can improve durability.

Among the above-described compounds for the protective layer, the perfluoroalkyl polyethers having modified terminals have a particularly excellent lubricating effect, and are useful as the material for the protective layer of the ferromagnetic thin metal layer type magnetic recording medium.

The magnetic recording mediums have been used in many places under varying environmental conditions in recent years. Thus, it has been demanded that the magnetic recording mediums have good running durability over a wide range of environmental conditions (i.e., wide varieties of temperature and humidity conditions) ranging from high-temperature and high-humidity conditions to low-temperature and low-humidity conditions. Conventional techniques cannot always sufficiently cope with these requirements.

Further, when the problem of corrosion resistance is taken into consideration, conventional techniques are considered to be more insufficient under the above working environmental conditions.

Since the magnetic layer is a thin metal film, corrosion resistance is an essential problem of the ferromagnetic thin metal film type magnetic medium in that the magnetic layer itself is deteriorated by the effects of oxygen and water in the air during storage.

The improvement in corrosion resistance is directed to minimizing and/or solving the following problems;

(1) Formation of rust from water condensed and dried on the ferromagnetic thin metal film;

(2) Gradual decrease in the amount of magnetic flux during storage under high temperature and humidity conditions (demagnetization);

(3) Formation of rust on the surface of the ferromagnetic thin metal film by the effects of sulfur dioxide and nitrogen oxide gases present in air; and (4) Deposition of salts such as NaCl, $MgCl_2$, etc., contained in seawater in coastal regions on the surface of the ferromagnetic thin metal film and subsequent formation and spreading of rust from the deposited or starting point (salt damage).

With regard to the above items (1), (2), and (3), various methods have been proposed for improving the corrosion resistance of the ferromagnetic thin metal film to a level which causes no practical trouble. With regard to the salt damage (item 4), however, an appropriate method has not been found as yet.

Further, it was found that the methods for solving the problems of the above items (1), (2), and (3) are not considered to be fully sufficient overall when all of the characteristics of the magnetic recording medium are taken into consideration. For example, some methods are effective in improving the corrosion resistance of the vapor deposition tape, but are not effective in other aspects or causes new problems.

For example, in a method wherein a protective layer comprising an inorganic material such as $SiO_2$, C or $TiO_2$ is provided on the ferromagnetic thin metal film, the protective layer must have a thickness of at least 300 Å to obtain the desired corrosion resistance. Such a large thickness causes a lowering in reproduction output due to spacing loss and the lowering of output is not preferred in short wave recording regions where the thin metal film medium is used, in particular.

Further, in methods for imparting corrosion resistance to the ferromagnetic thin metal film by various after-treatments (for example, a method wherein the magnetic recording medium is allowed to stand in an atmosphere under given temperature and humidity conditions, a method wherein a passive film is electrochemically provided and a method wherein a vapor deposition web film is subjected to an oxidation treatment), corrosion resistance to water can be improved (the problems of the items (1) and (2)), but it is still insufficient to prevent rust from being formed on the ferromagnetic thin metal film by salts (salt damage).

Further, JP-A-58-26319, JP-A-58-23622, JP-A-58-60432, JP-A-59-63031 and JP-A-59-60738 disclose a method wherein the ferromagnetic thin metal film is brought into contact with ozone during the formation of the film or the ferromagnetic thin metal film is exposed to an ozone atmosphere after the formation of the film to thereby improve corrosion resistance. This method is remarkable in improving the corrosion resistance of the ferromagnetic thin metal film relative to other conventional methods.

However, these methods alone are still considered to be insufficient with respect to corrosion resistance against salt damage (the problem of the above item (4)).

Most methods for improving corrosion resistance, in particular, do not relate to an improvement in running properties.

JP-A-3-207019 discloses a method wherein a specific amount of a perfluoropolyether having a polar group is fixed to the surface of the ferromagnetic thin metal film to thereby improve running properties and durability. However, when the improvement in corrosion resistance against salt damage is more desirable or the working atmosphere with respect to high/low-temperature and humidity conditions becomes more severe, this method cannot provide the improvement in running durability because the manufacturing method and the specific amount thereof are apparently insufficient due to the formation of a dense protective film.

As described above, a method capable of providing a ferromagnetic thin metal film type recording medium excellent in electromagnetic characteristics which is best suited for high density recording has not been proposed yet. In recent years, conventional methods do not provide the desired results when the ferromagnetic thin metal film type recording medium is exposed to a wide range of working atmosphere conditions.

The present invention has been accomplished with a view to solving the above-mentioned problems.

SUMMARY OF THE INVENTION

An object of the present invention is to provide a ferromagnetic thin metal film type magnetic recording medium which has improved running properties, durability and corrosion resistance without deterioration of electromagnetic characteristics and, moreover, which is excellent in practice when exposed to a wide range of environmental conditions.

Another object of the present invention is to provide a method for preparing the above-described ferromagnetic thin metal film type magnetic recording medium.

The above-described objects of the present invention have been achieved by providing:

a ferromagnetic thin metal film type magnetic recording medium comprising a non-magnetic support having thereon a ferromagnetic thin metal film, wherein a perfluoropolyether having at least one polar group having a saturation adsorption amount ($mg/m^2$) of at least 4.0 $mg/m^2$ against the ferromagnetic thin metal film is coated or applied onto the surface of the ferromagnetic thin metal film;

a method for preparing a ferromagnetic thin metal film type magnetic recording medium comprising the steps of depositing a metal vapor stream comprising Co as a main component on a non-magnetic support in an oxygen gas-containing atmosphere to form a ferromagnetic thin metal film, exposing the ferromagnetic thin metal film to an oxygen or ozone containing atmosphere, and then applying a perfluoropolyether having at least one polar group to the surface of the ferromagnetic thin metal film;

a method for preparing a ferromagnetic thin metal film type magnetic recording medium comprising the steps of depositing a metal vapor stream comprising Co as a main component on a non-magnetic support in an oxygen gas-containing atmosphere to form a ferromagnetic thin metal film, holding the ferromagnetic thin metal film at a temperature of 80° to 180° C. for 1 to 60 seconds for heat-treatment, and then applying a perfluoropolyether having at least one polar group to the surface of the ferromagnetic thin metal film; and a method for preparing a ferromagnetic thin metal film type magnetic recording medium comprising the steps of depositing a metal vapor stream comprising Co as a main component on a non-magnetic support in an oxygen gas-containing atmosphere to form a ferromagnetic thin metal film, treating the ferromagnetic thin metal film by holding it in an inert gas, and then applying a perfluoropolyether having an oxo acid derivative group as a polar group to the surface of the ferromagnetic thin metal film.

DETAILED DESCRIPTION OF THE INVENTION

The present invention will be illustrated in more detail below.

A perfluoropolyether having at least one polar group is deposited on or contained in the surface of the ferromagnetic thin metal film, that is, the perfluoropolyether having at least one polar group having the saturation adsorption amount of at least 4.0 mg/m² against the ferromagnetic thin metal film is coated on the ferromagnetic thin metal film, whereby a stable, firm protective layer is formed. A magnetic recording medium is obtained having good durability over a wide relative speed region (e.g., the region ranging from high to low speed and starting from a still state), and a high corrosion resistance capable of overcoming salt damage.

In the present invention, the compound to be applied to the ferromagnetic thin metal film is a perfluoropolyether having at least one polar group, and the compound is coated on the ferromagnetic thin metal film, having the saturation adsorption amount of at least 4.0 mg/m² against the ferromagnetic thin metal film which is larger than that in conventional methods, whereby the resulting protective layer for the ferromagnetic thin metal film is firm and stable. It is thought that the above-described effect can be obtained by the formation of the firm, stable protective layer.

According to the present invention, there can be obtained a thin metal film type magnetic recording medium which is excellent in running durability in the region ranging from high to low speed, in starting from a still state, under wide temperature and humidity conditions, and which has good corrosion resistance capable of overcoming salt damage.

The effect obtained by the present invention is thought to be due to the fact that a layer comprising a considerable amount of the perfluoropolyether firmly bonded to the ferromagnetic thin metal film is formed on the ferromagnetic thin metal film.

The term "saturation adsorption amount", as used herein, means such an amount that the whole surface of the ferromagnetic thin metal film is covered with a monomolecular layer, and refers to the saturation adsorption amount determined from an adsorption isotherm at 25° C. by using a fluorinated compound solvent (e.g., "ZS100" manufactured by Montedison) which is used in the application of the perfluoropolyether having at least one polar group to the surface of the ferromagnetic thin metal film.

The behavior of the perfluoropolyether having at least one polar group adsorbed on the ferromagnetic thin metal film is a Langmuir type. Accordingly, the saturation adsorption amount, as defined herein, is considered to be such an amount that the monomolecular layer of the perfluoropolyether having at least one polar group is formed on the surface of the ferromagnetic thin metal film.

Concretely, the saturation adsorption amount is determined in the following manner.

(1) A ferromagnetic thin metal film type tape (1 m long by 8 mm wide) having no back coat layer is immersed in each of three ZS100 solutions containing the perfluoropolyether having at least one polar group at a concentration of $8 \times 10^{-4}$ wt. %, $2.4 \times 10^{-3}$ wt. % or $4.8 \times 10^{-3}$ wt. %, and the tape is held in each solution at 25° C. for 48 hours to thereby allow the perfluoropolyether having at least one polar group to be adsorbed on the ferromagnetic thin metal film.

(2) The magnetic tape is then taken out of the solution, and the amount of fluorine adsorbed on the ferromagnetic thin metal film is measured with a fluorescent X-ray analyzer ("SXF-1000" manufactured by Shimadzu Seisakusho Ltd.) to determine the adsorption amount.

Figure 1:
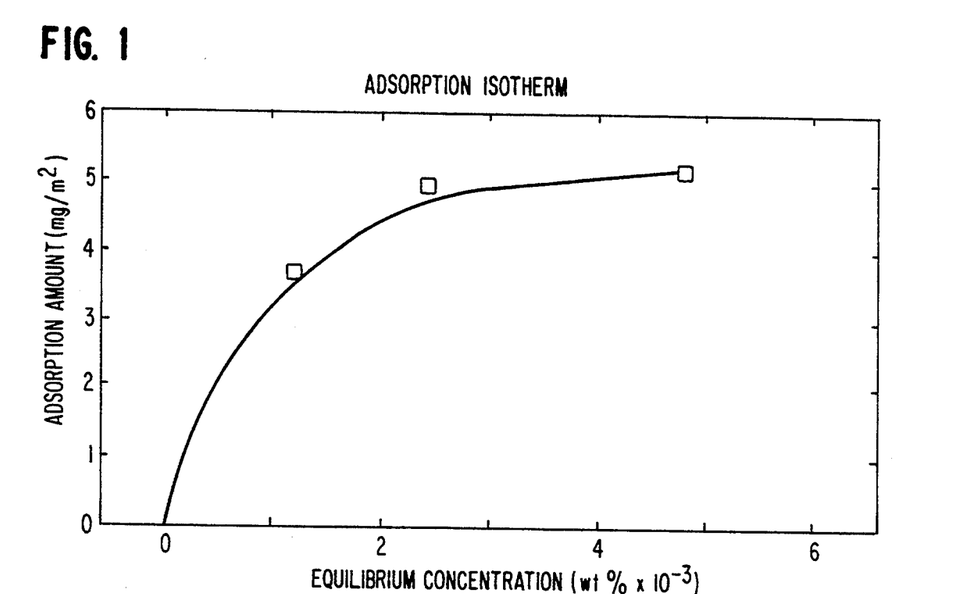
FIG. 1 is a graph showing the adsorption isotherm of the perfluoropolyether having at least one polar group adsorbed on the ferromagnetic thin metal film.

There is determined an adsorption isotherm as shown in FIG. 1 where the abscissa axis (x-axis) represents the equilibrium concentration (C) and the ordinate axis (y-axis) represents the adsorption amount (A) of the perfluoropolyether having at least one polar group adsorbed on the ferromagnetic thin metal film.

Figure 2:
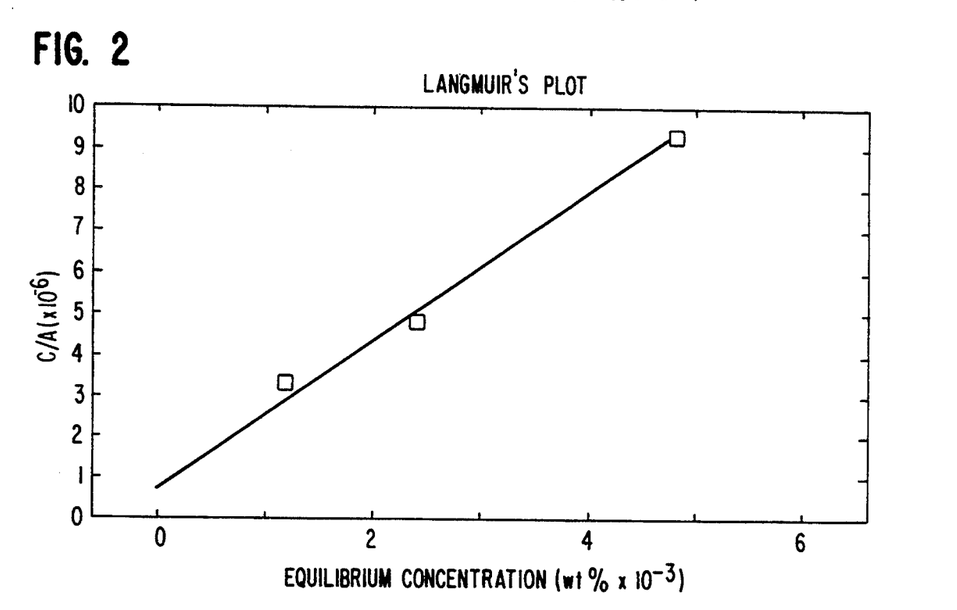
FIG. 2 is a graph showing a Langmuir's plot obtained from the adsorption isotherm of the perfluoropolyether having at least one polar group adsorbed on the ferromagnetic thin metal film.

(3) A graph is made by plotting the equilibrium concentration (C) (x-axis) versus C/A (y-axis) as shown in FIG. 2. The reciprocal of the gradient of the straight line on the Langmuir's plot of FIG. 2 is determined as the saturation adsorption amount (a) from the following Langmuir's adsorption isotherm:

$$C/A = 1/(Ka) + aC$$

wherein C represents the equilibrium concentration; A represents the adsorption amount; a represents the saturation adsorption amount; and K represents the equilibrium constant.

The unit of the saturation adsorption amount is mg/m² where the denominator m² is the macroscopic surface area of the medium. The film unevenness on the surface of the ferromagnetic thin metal film and the fine structure of a crystal column forming the ferromagnetic thin metal film are not taken into consideration.

Examples of the polar group of the perfluoropolyether having at least one polar group which can be used in the present invention include an oxo acid group, a sulfo group, a sulfoxido group, a diphenyl ether group, an epoxy group, an alcoholic hydroxyl group, an ester group, a silane coupling group, an alkene group, a chelate group and a heterocyclic group. These groups can be used without particular limitation.

However, preferred polar groups are oxo acid groups, sulfo groups, sulfoxido groups and diphenyl ether groups. Particularly preferred are the oxo acid groups.

Oxo acid refers to a compound in which all atoms bonded to a central atom are oxygen atoms and a part or all of the oxygen atoms is bonded to hydrogen atoms to form hydroxyl groups whose hydrogen produces hydrogen ions to thereby exhibit acidic properties (see, *Rikagaku Jiten* published by Iwanami Shoten). In addition, compounds where a carbon or sulfur atom are bonded to the central atom (such as carboxylic acids and sulfonic acids) are also included as the derivatives thereof.

There is no particular limitation with regard to the positions and the number of the polar groups in the molecule of the perfluoropolyether.

The polar group may be bonded to the main perfluoropolyether chain via other molecular chains such as an amido, benzene or alkylene group.

The main perfluoropolyether chain has preferably from 6 carbon atoms to 150 carbon atoms, particularly preferably, from 9 carbon atoms to 50 carbon atoms.

When the number of the carbon atoms is too small, the sliding of the magnetic recording medium is poor and a problem in regard to the running properties is caused. When the number of carbon atoms is too large, the mobility of the molecule is large resulting in molecular interference during coating and, as a result, the perfluoropolyether having at least one polar group is adsorbed with difficulty. Accordingly, even when the saturation adsorption amount is not less than 4.0 mg/m$^2$, the influence of mobility is liable to be much more increased since the perfluoropolyether having at least one polar group must be applied to the surface of the magnetic layer in a short time when coated. As a result, there is a possibility that the desired durability cannot be fully obtained. Accordingly, it is preferred that the number of the carbon atoms is not too large.

The molecular chain of the perfluoropolyether is preferably a straight chain, but may be branched. When the molecular chain is a branched chain, the branched chain has preferably not more than 2 carbon atoms.

When the branched molecular chain is too large, the volume which is occupied by the molecule is increased, and hence a dense protective layer cannot be formed and at the same time, the orientation of the molecule becomes irregular. Accordingly, corrosion resistance is not sufficient and sliding properties become poor.

Examples of the perfluoropolyether having at least one polar group which can be used in the present invention include, but are not limited to, the following compounds 1 to 8. Compounds where the polar group is an oxo acid group:

Compound 1

KRYTOXK157FSL (Du Pont)

Compound 2
F(CF$_2$CF$_2$CF$_2$O)$_{22}$CH$_2$CH$_2$COOH
DEMNUM-SH
(Daikin Kogyo Co., Ltd.)

Compound 3
HOOCCF$_2$(OC$_2$F$_4$)$_{10}$(OCF$_2$)$_{10}$CF$_2$COOH
Fombrin Z-DIAC
(Montedison)

Compound 4

Compound 5

Compounds where the polar group is a sulfo group, a sulfoxido group or a diphenyl ether group:

Compound 6

Compound 7

Compound 8

-continued

Compounds 1 to 3 are commercially available from E. I. Du Pont de Nemours & Company (Inc.), Daikin Kogyo Co., Ltd. and Montedison.

The amount coated of the perfluoropolyether having at least one polar group to be applied to the surface of the ferromagnetic thin metal film of the magnetic recording medium of the present invention is preferably 4.0 to 40 mg/m$^2$ and more preferably 4.0 to 20 mg/m$^2$, and the ratio (by weight) of the coating amount/saturation adsorption amount is preferably from 1 to 5, more preferably from 1 to 3 and most preferably from 1 to 2.

The coating amount refers to a value obtained by determining the amount of fluorine on the ferromagnetic thin metal film of the magnetic recording medium with a fluorescent X-ray analyzer ("SXF-1000" manufactured by Shimadzu Seisakusho Ltd.) after coating.

When the amount of the perfluoropolyether having at least one polar group to be applied to the surface of the ferromagnetic thin metal film is small, a firm, dense protective layer cannot be formed, corrosion resistance cannot overcome salt damage, and durability is poor. When the amount is too large, the coefficient of friction during running at low speed is increased and sticking is likely to be caused.

The above-described perfluoropolyether having at least one polar group may be used alone or as a mixture with other lubricants.

Examples of the other lubricants include fatty acids, metallic soap, fatty acid amides, fatty acid esters, higher aliphatic alcohols, monoalkyl phosphates, dialkyl phosphates, trialkyl phosphates, paraffins, silicone oils, animal and vegetative oils, mineral oils, higher aliphatic amines; fine powders of inorganic materials such as graphite, silica, molybdenum disulfide and tungsten disulfide; fine powders of resins such as polyethylene, polypropylene, polyvinyl chloride, ethylene-vinyl chloride copolymer and polytetrafluoroethylene; α-olefin polymers; and unsaturated aliphatic hydrocarbons which are liquid at room temperature.

Examples of methods for forming the surface protective lubricating layer in the present invention include a method wherein the material is dissolved in an organic solvent, and the solution is coated or sprayed on a base sheet and then dried; a method wherein a base sheet is rubbed with an object impregnated with the material to thereby effect coating; a method wherein a base sheet is immersed in a solution of the material dissolved in an organic solvent to allow the material to be adsorbed by the surface of the base sheet; and a method wherein the monomolecular film of the material is formed on the surface of a base sheet by means of a Langmuir's project process.

In the present invention, the surface of the ferromagnetic thin metal surface may be modified by LrV irradiation, glow discharge or plasma to improve the adhesion between the protective lubricating layer and the thin metal film.

The protective lubricating layer may have a single-layer structure or a multi-layer structure.

The object of the present invention described above can be effectively achieved when the ferromagnetic thin metal film has an oxygen content of preferably at least 15 at. % (atomic %), more preferably, at least 20 at. % (atomic %).

When the oxygen content is below 15 at. %, the saturation adsorption amount of the perfluoropolyether having at least one polar group cannot be increased, thereby firm adsorption cannot be obtained even if the saturation adsorption amount can be increased. Accordingly, the effect on the corrosion resistance and running properties is insufficient.

When the oxygen content exceeds 30 at. %, the non-magnetic component is increased and the ferromagnetic thin metal film has high electromagnetic characteristics.

Further, it is preferred that the ferromagnetic thin metal film has an oxygen distribution in the direction of the thickness such that the oxygen content in the vicinity of the non-magnetic support and that in the vicinity of the surface of the magnetic layer are larger than that in the central part or in the vicinity thereof.

More specifically, it is preferred that when the ferromagnetic thin film is divided into five equal parts in the direction of the thickness by the depth analysis of AES (Auger electron spectroscopy), the ferromagnetic thin metal film has an oxygen content distribution such that the oxygen content in the central area is lower than that in the vicinity of both the surface area and the non-magnetic support area (the surface area of 1/5 of the whole thickness in the direction of the non-magnetic support from the surface is referred to as the vicinity of the surface, and the area of 1/5 of the whole thickness in the direction of the surface from the interface between the non-magnetic support and the ferromagnetic thin metal film is referred to as the vicinity of the non-magnetic support).

Furthermore, it is preferred that the oxygen content in the vicinity of the surface of the ferromagnetic thin metal film and that in the vicinity of the non-magnetic support are at least 5 at. % (atomic and that the oxygen content in the central area is 3 to 4 at. % (atomic %).

There are many methods for obtaining the ferromagnetic thin metal film by which the perfluoropolyether having at least one polar group having a saturation adsorption amount of at least 4.0 mg/m$^2$ against the ferromagnetic thin metal film is coated and applied. However, the following methods can be effectively used in the present invention.

Method (1)

Treatment of ferromagnetic thin metal film with ozone gas

This method comprises depositing a metal vapor stream comprising Co as a main component on the non-magnetic support in an oxygen gas-containing atmosphere to form a ferromagnetic thin metal film, exposing the ferromagnetic thin metal film to an oxygen or ozone gas-containing atmosphere, and applying the perfluoropolyether having at least one polar group to the ferromagnetic thin metal film.

Method (2)

Heat-treatment of ferromagnetic thin metal film

This method comprises depositing a metal vapor stream comprising Co as a main component on the non-magnetic support in an oxygen gas-containing atmosphere to form a ferromagnetic thin metal film, holding the ferromagnetic thin metal film at a temperature of preferably 80° to 180° C. (more preferably 100° to 160° C.) for preferably 1 to 60 seconds (more preferably 1 to 30 seconds) for heat-treatment, and then applying the perfluoropolyether having at least one polar group to the ferromagnetic thin metal film.

Method (3)

Treatment of ferromagnetic thin metal film with inert gas

This method comprises depositing a metal vapor stream comprising Co as a main component on the non-magnetic support in an oxygen gas-containing atmosphere to form a ferromagnetic thin metal film, holding the ferromagnetic thin metal film in an inert gas (e.g., nitrogen, argon, helium) for treatment, and applying the perfluoropolyether having an oxo acid derivative group as a polar group to the ferromagnetic thin metal film.

In the above-described methods, before the application of the perfluoropolyether having the polar group, the ferromagnetic thin metal film is treated to increase the amount of the perfluoropolyether to be adsorbed, or the use of the perfluoropolyether having a specific polar group is combined with the treatment of the surface of the ferromagnetic thin metal film.

Among them, method (1) wherein the ferromagnetic thin metal film is treated in an ozone gas-containing atmosphere is most preferred.

The reason why a distinctive effect can be obtained by the above methods in the present invention is not clear. However, it is thought to be due to the fact that by exposing the metal film to the ozone gas-containing atmosphere, an oxidized film which is denser than that formed by conventional oxidation treatment is formed on the surface of the ferromagnetic thin metal film, and the surface of the ferromagnetic thin metal film is activated to thereby increase the adsorption site of the perfluoropolyether having the polar group.

When the oxygen content in the vicinity of the surface of the ferromagnetic thin metal film and that in the vicinity of the non-magnetic support are higher than the oxygen content in the central area therebetween, the effect obtained by exposing the ferromagnetic thin metal film to the ozone-gas-containing atmosphere can be further increased, and a magnetic recording medium having high resistance to salt damage can be obtained.

The magnetic recording medium can be prepared by forming the ferromagnetic thin metal film having a given thickness on the non-magnetic support and carrying out a treatment for exposing the ferromagnetic thin metal film to the ozone gas-containing atmosphere.

In the treatment for exposing the film to the ozone gas-containing atmosphere, it is desirable that the concentration of ozone and the treating time are controlled at the temperature which the ferromagnetic thin metal film is held.

The temperature of the ferromagnetic thin metal film is not critical. However, treatment at room temperature is not efficient because the treatment must be carried out in an atmosphere containing ozone at a higher concentration for a longer period of time.

A higher temperature is preferred from the view point of improving corrosion resistance. However, when the temperature is 140° C. or higher, a problem with regard to the heat resistance of the high-molecular base film, particularly PET (polyethylene terephthalate) film conventionally used for magnetic tapes, is caused. Further, when the temperature is 140° C. or higher, the cupping or curling of the tape is increased, and head contact becomes poor. Accordingly, a temperature of 140° C. or higher is not preferred.

When the above-described matters are taken into consideration, it is desirable that the temperature of the ferromagnetic thin metal film during the course of the treatment with ozone gas is preferably from 80° to 140° C. and more preferably from 90° to 130° C.

In regard to the concentration of ozone and the treating time, the concentration of ozone (x) is preferably 10,000 to 120,000 ppm and more preferably 50,000 to 100,000 ppm, the treatment time (y) is preferably 0.1 to 60 seconds and more preferably 1 to 30 seconds, and the product of x and y (wherein x is the concentration (ppm) of ozone and y is the treating time (sec)) is preferably at least 150,000, more preferably 150,000 to 1,500,000 and most preferably 150,000 to 1,000,000. When the product is smaller than 150,000, the effect of protecting the ferromagnetic thin metal film from salt damage is insufficient.

Further, it is desirable that the surface of the ferromagnetic thin metal film is cleaned before the film is exposed to the ozone gas atmosphere. If the surface of the ferromagnetic thin metal film is contaminated, the effect of the present invention cannot be sufficiently obtained because part of the ozone is consumed to remove contaminants.

The ferromagnetic thin metal film is controlled, for example, by the contact angle with water. It is desirable that the ozone treatment is carried out while keeping surface conditions at a contact angle of 60 degrees or below.

The ozone gas-containing atmosphere may be an atmosphere comprising dry air containing ozone or an atmosphere comprising an inert gas (e.g., nitrogen, argon, helium) containing ozone.

The treatment with ozone is carried out by exposing the ferromagnetic thin film to a treating chamber containing ozone produced in an ozone generating source such as an ozonizer for a given period of time. The treatment can be carried out by a batch treatment or a continuous treatment.

Figure 3:
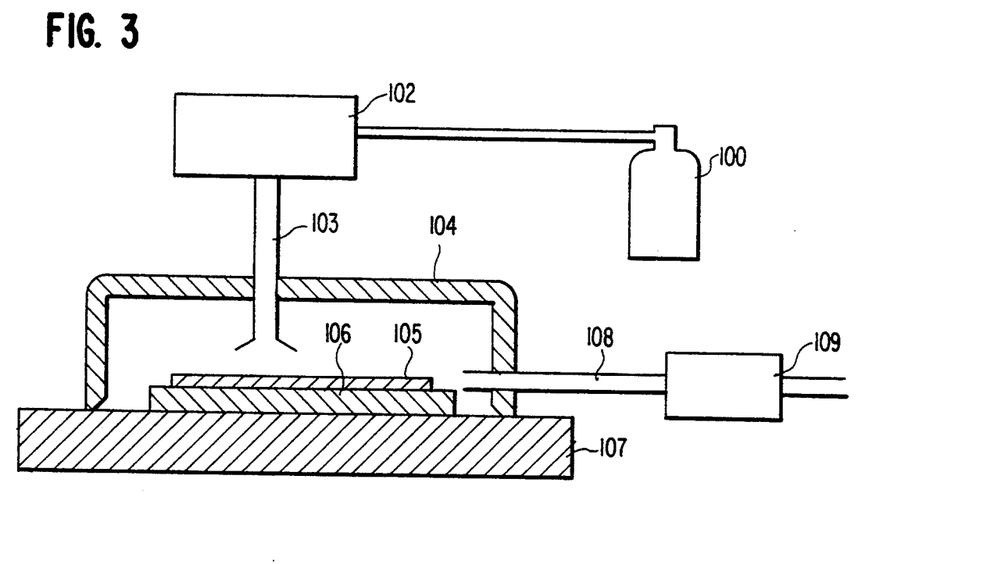
FIG. 3 is a cross-sectional view of a batch treating device for treating the ferromagnetic thin metal film with ozone gas.

Referring now to FIG. 3 (which is a cross-sectional view of the batch treating device), above the hot plate 106 there is an upper space which is a treating zone and covered with a casing table 107 and a casing 104. A sample 105 to be treated is fixed on the hot plate so as to allow the ferromagnetic thin metal film formed on the non-magnetic support to be placed upward. The sample is held at a given temperature by heat from the hot plate. Separately, oxygen gas from an oxygen bomb 100 is introduced into an ozonizer 102 to produce ozone. Oxygen gas which is partially ozonized is fed to the sample 105 through an introducing pipe 103 to thereby treat the ferromagnetic thin metal film with ozone. Gas which is partially ozonized is introduced into a catalytic racker 109 through an exhaust tube 108 to decompose it.

Figure 4:
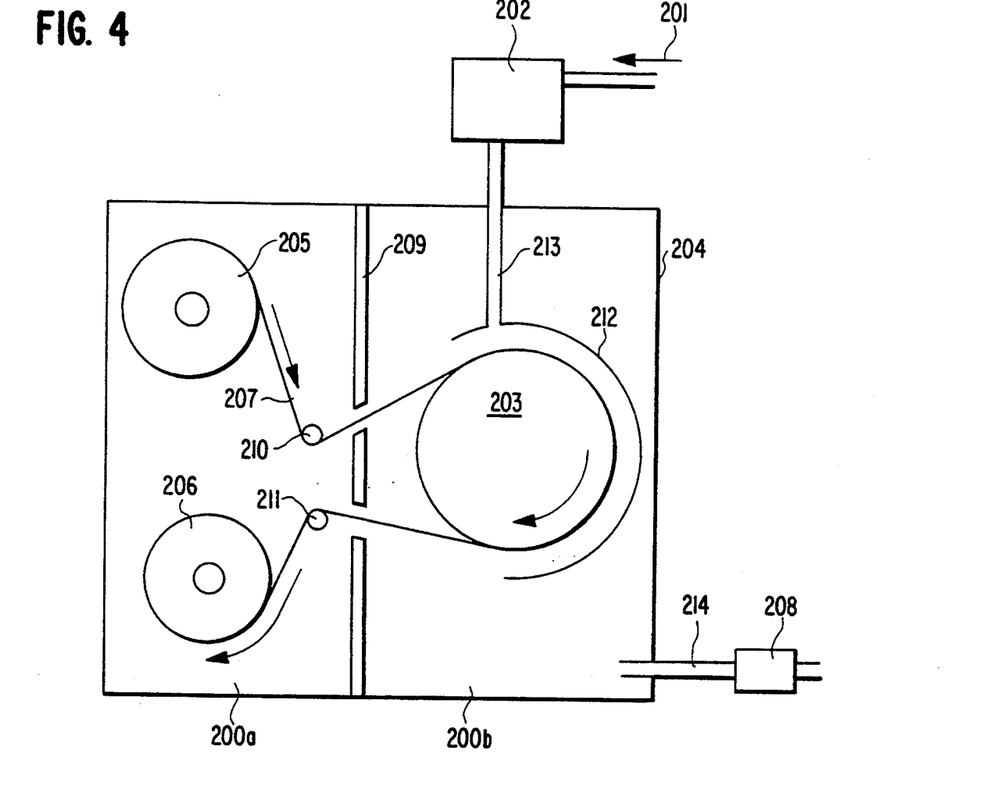
FIG. 4 is a cross-sectional view of a continuous treating device for treating the ferromagnetic thin metal film with ozone gas.

Referring to FIG. 4 (which is a cross-sectional view of the continuous ozone-treating device 204), a continuous sample (magnetic recording medium) 207, which comprises the ferromagnetic thin metal film formed on the non-magnetic support and is to be treated, is wound around a wind-up roll 205 in a delivery wind-up chamber 200a. The sample 207 is conveyed by means of a conveying roll 210 and passed through a partition wall 209 into an ozone-treating chamber 200b. The sample is conveyed along a heating roll 203, again passed through the partition wall 209, conveyed by means of the conveying roll 211 and wound around a wind-up roll 206. The continuous sample 207 comprising the ferromagnetic thin metal film formed on the non-magnetic support is conveyed so as to allow the ferromagnetic thin metal film-to be outward placed on the heating roll. The sample is heated to a given temperature during the course of winding around the heating roll 203. A cover 212 is provided on the outer periphery side of the heating roll. Gas containing ozone produced in an ozonizer 202 having an oxygen gas introducing pipe 201 is fed to the sample 207 through an ozone introducing pipe 213 while the sample is conveyed by means of the heating roll, whereby the treatment of the ferromagnetic thin metal film with ozone can be carried out. Ozone-containing gas is introduced into a catalytic cracker 208 through an exhaust tube 214 to decompose it.

Figure 5:
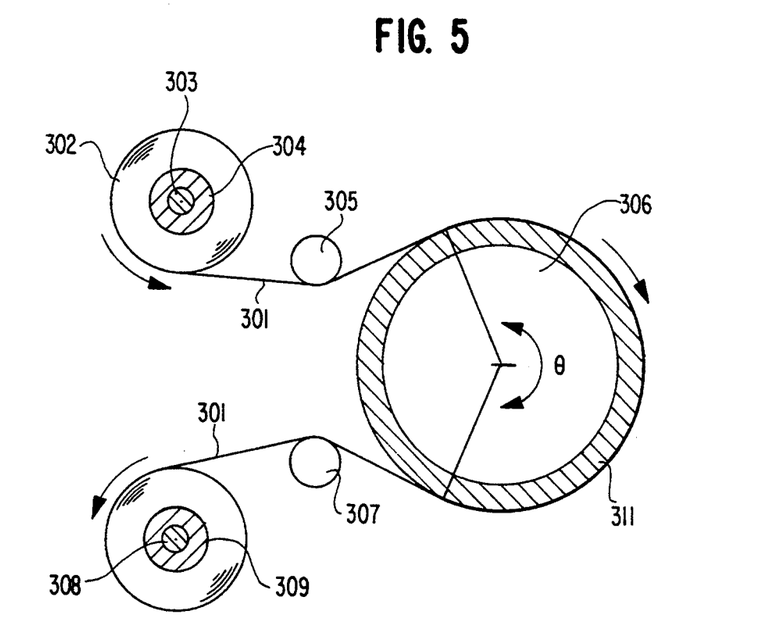
FIG. 5 is a cross-sectional view of a heat treating device for treating the ferromagnetic thin metal film.

In the method (2), heat treatment may be carried out by any method, so long as heat treatment is carried out at a temperature of 80° to 180° C. For example, heat treatment may be carried out from the back side or from the magnetic layer side by using a heating roll for coating with a coater. Alternatively, as shown in FIG. 5, a rewinder is provided with a heating roll 310, and heat treatment may be carried out from the back side, the magnetic layer side or the heat-treated side. However, heat treatment from the back side is preferred because when the magnetic layer side and the heating roll 306 are brought into contact with each other, there is a possibility that organic matters adhered on the metal roll and gas are adsorbed on the magnetic surface and the saturation adsorption amount of the lubricant is reduced. The heat treating time is preferably from 1.0 second to 60 seconds (most preferably from 1.0 to 10 seconds). This is because when the treating temperature is too low or the heat treating time is too short, the effect of heat treatment cannot be obtained, while when the treating temperature is too high or the heat treating time is too long, the magnetic surface is cracked by the heat shrinkage of a base film 301. Accordingly, it is preferred that a material for the main body of heating roll 306 is metal, and a material 311 which covers the heating roll 306 is a material (e.g., polyfluoroethylene) having a lower thermal conductivity than that of the material for the main body of the heating roll. This is because the thermal shock of the heating roll can be reduced by the surface covering layer and cracking can be prevented even when the treatment is carried out at a high temperature.

In the method (3), the treatment with an inert gas can be carried out by various methods; for example, a method wherein when the vapor deposition chamber is released from vacuum, an inert gas is introduced into the chamber and the lubricant is coated while the inert gas (e.g., nitrogen, argon, helium) is continuously sprayed; or a method wherein the lubricant is coated on the sample stored in an inert gas by means of a coater. It is essential that the lubricant is kept out of contact with the air until the lubricant is coated on the surface of the magnetic layer. This is because the adsorption activity of the thin metal film is high during the formation of the film and the activity can be maintained in an inert gas. However, when the film is brought into contact with the air, the adsorption active point of the lubricant is poisoned by contaminants such as hydrocarbons and moisture in the air or incomplete oxidation by oxygen, and the saturation adsorption amount is reduced.

Examples of materials which can be used in the formation of the ferromagnetic thin metal film of the present invention include ferromagnetic metals such as iron (Fe), cobalt (Co), nickel (Ni), etc. and ferromagnetic alloys such as Fe-Co, Fe-Ni, Co-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-W, Co-Ni-Re, etc. The ferromagnetic thin metal film of the present invention can be formed from these ferromagnetic metals or alloys by vapor deposition methods. The thickness of the film is in the range of 0.05 to 1.0 μm.

In addition thereto, the vapor of the ferro-magnetic thin metal film may contain 0, N, Cr, Ga, As, Sr, Zr, Nb, Mo, Rh, Pd, Su, Sb, Te, Pm, Re, Os, Ir, Au, Hg, Pb, Mg, Bi, etc.

The oxygen content in the ferromagnetic thin metal film is calculated by the depth analysis of AES (Auger electron spectroscopy).

The ferromagnetic thin metal film of the magnetic recording medium of the present invention is formed on the non-magnetic support by vacuum film forming methods such as vacuum metallizing method, sputtering process, etc. When the film is formed, oxygen is introduced into the film forming chamber to allow a predetermined amount of oxygen to be contained in the resulting ferromagnetic thin metal film.

The thickness of the ferromagnetic thin metal film is in the range of preferably 500 to 3000 Å.

Examples of the non-magnetic support which can be used in the present invention include plastic bases such as polyethylene terephthalate, polyimides, polyamides, polyvinyl chloride, cellulose triacetate, polycarbonates, polyethylene naphthalate and polyphenylene sulfide; and Al, Ti and stainless steel.

Before the ferromagnetic thin metal film is formed, it is desirable for fine protrusions to be provided on the surface of the non-magnetic support to improve running durability because this results in providing proper unevenness on the surface of the magnetic layer. The density of the fine protrusions on the surface of the non-magnetic support is preferably $2 \times 10^6$ to $2 \times 10^8$ protrusions per mm$^2$, and the height of the protrusion is preferably 1 to 50 nm.

The thickness of the non-magnetic support varies depending on the use thereof, but is generally 3 to 50 μm.

Further, a back coat layer comprising a coating solution mainly composed of fine powder such as carbon black and a binder resin may be provided on the side of the non-magnetic support opposite the ferromagnetic thin metal film side to improve the running properties of the magnetic recording medium of the present invention.

An interlayer may be provided between the non-magnetic support and the ferromagnetic thin metal film to improve the adhesion of the ferromagnetic thin metal film.

The present invention is further illustrated by the following examples and comparative examples.

EXAMPLE 1

Figure 6:
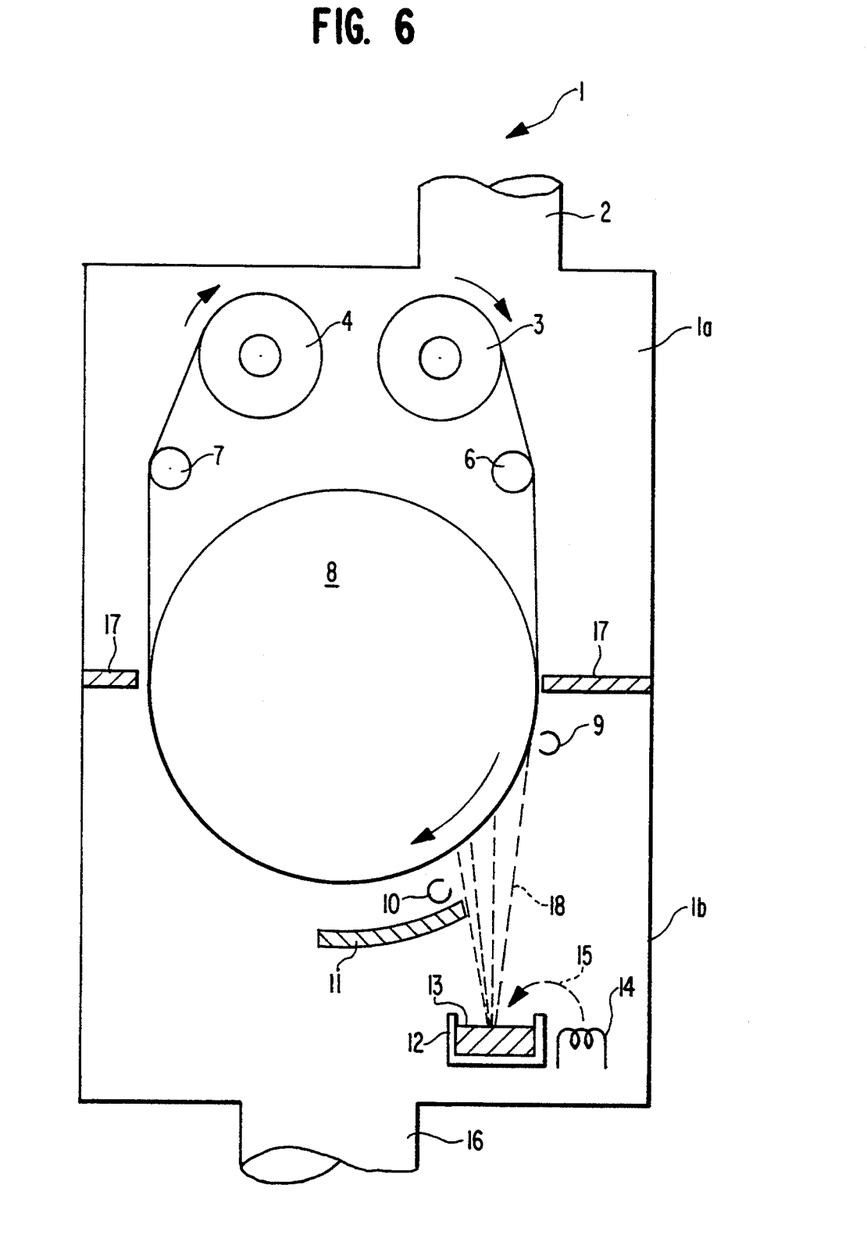
FIG. 6 is a cross-sectional view of a vapor deposition apparatus for forming the ferromagnetic thin metal film.

FIG. 6 is a cross-sectional view of the vapor deposition apparatus 1.

A sample of a magnetic recording medium was prepared in the following manner by using the vapor deposition apparatus 1.

A delivery winding chamber 1a was provided with an exhaust port 2, and a film forming chamber 1b was provided with an exhaust port 16. Evacuation was made through these exhaust ports to reduce pressure in the film forming chamber 1b to a degree of vacuum of not higher than $5 \times 10^{-5}$ Torr. Subsequently, a non-magnetic support 5, composed of a polyethylene terephthalate film (width: 100 mm, thickness: 9.7 μm) wound around a delivery roll 3 provided in the delivery winding chamber 1a, was delivered at a conveying speed of 20 m/min by means of a conveying roll 6 and passed through a space between a partition wall 17 and a cooling cap 8 into the film forming chamber. The film was conveyed along the cooling can 8, passed through a space between the cooling can 8 and a partition wall 17, conveyed into the delivery winding chamber 1b by means of a conveying roll 7 and wound around a winding roll 4.

Separately, oxygen at a rate of 1000 ml/min was introduced into the chamber through a first oxygen introducing port 9, and oxygen at a rate of 800 ml/min was introduced into the chamber through a second oxygen introducing port 10. Co-Ni alloy 13, placed in a crucible 12, was heated by electron beam 15 from an electron beam source 14, and a vapor stream 18 was deposited on the non-magnetic support by an oblique incident evaporation method at an incident angle of 35 degrees while controlling an incident angle by means of a shutter 11 to form a ferromagnetic thin metal film having a thickness of 2200 Å. Thus, a web film (roll) of a magnetic recording medium was obtained.

A 80 mm square sample was cut from the resulting magnetic recording medium and treated with ozone by using the batch ozone treating device of FIG. 3.

The concentration of ozone in the treating chamber was 28,000 ppm. The sample was heated to 120° C. by the hot plate.

The treating time was 30 seconds, thus preparing an ozone-treated base film.

A solution of each lubricant given in Table 1 dissolved in a solvent ZS100 was coated on the ferromagnetic thin metal film of the ozone-treated base film in such an amount as to give a coating weight given in Table 1. The coated sample was dried and slit into films of 8 mm in width. Thus, sample Nos. 1 to 8, shown in Table 1, were prepared.

TABLE 1

| Sample No. | Perfluoropolyether having polar group | Coating Weight (mg/m²) | Saturation adsorption amount (mg/m²) | Coefficient of friction Condition A | Coefficient of friction Condition B |
|---|---|---|---|---|---|
| 1 | Compound 1 | 10 | 6.7 | 0.19 | 0.2 |
| 2 | Compound 4 | 10 | 6.3 | 0.2 | 0.2 |
| 3 | Compound 6 | 10 | 4.4 | 0.24 | 0.24 |
| 4 | Compound 7 | 5 | 4.1 | 0.26 | 0.27 |
| 5 | Compound 8 | 15 | 4.9 | 0.22 | 0.23 |
| 6 (Comp.) | Compound A | 10 | 0.2 | 0.53 | at least 0.6 |
| 7 (Comp.) | Compound B | 10 | 3.1 | 0.35 | 0.41 |
| 8 (Comp.) | Omitted | 0 | — | at least 0.6 | at least 0.6 |

| Sample No. | Sticking Condition A | Sticking Condition B | Jitter/μs | Still durability Condition A | Still durability Condition B | Corrosion resistance |
|---|---|---|---|---|---|---|
| 1 | not sticked | not sticked | 0.09 | at least 60 min | at least 60 min | 6 |
| 2 | not sticked | not sticked | 0.1 | at least 60 min | at least 60 min | 6 |
| 3 | not sticked | not sticked | 0.15 | at least 60 min | at least 60 min | 6 |
| 4 | not sticked | not sticked | 0.22 | at least 60 min | at least 60 min | 6 |
| 5 | not sticked | sticked | 0.13 | at least 60 min | at least 60 min | 6 |
| 6 (comp.) | sticked | sticked | could not be measured | 15 min | 10 min | 4 |
| 7 (comp.) | not sticked | sticked | 0.55 | 40 min | 30 min | 5 |
| 8 (comp.) | sticked | sticked | could not be measured | 1 min or below | 1 min or below | 4 |

Compound A (Comp.) KRYTOX143AZ (Du Pont)

$$F(CF_2-CH_2O)_{10}CF_2-CF_3$$
$$|$$
$$CF_3$$

Compound B (Comp.) DEMNUM-SA (Daikin Kogyo Co., Ltd.)

$$F(CF_2-CF_2-CF_2O)_{10}CF_2-CF_2-CH_2OH$$

The saturation adsorption amount of the resulting magnetic tape was measured in the above-described manner (see Table 1). Further, the resulting tape was tested to examine a friction of coefficient (μ value) of the tape against a stainless steel pole under conditions (A) (40° C., 70% RH) and (B) (10° C., 15% RH). Furthermore, repeated running durability and still durability were examined by using an eight mm-VTR. Moreover, jitter and the degree of corrosion resistance were examined. The results are shown in Table 1.

Measurement of Jitter

Jitter is a deviated amount from the average of time intervals of horizontal synchronizing signals when a color bar is recorded by using an eight mm-VTR ("FUJIX-8 M6 type" manufactured by Fuji Photo Film Co., Ltd.) and then reproduced. The actual jitter was measured by using MK 611 (having no filter, manufactured by Meguro Denpa KK) at 5° C. and 10% RH.

Measurement of a coefficient of friction

A coefficient of friction (μ) was measured in the following manner.

The surface of the magnetic layer of the magnetic tape sample and a stainless steel pole were brought into contact with each other under a tension ($T_1$) of 50 g at a wrapping angle of 180° C., and there was measured a tension ($T_2$) required for running the tape at a constant speed of 10 mm/sec. A coefficient of friction (μ) was calculated from the measured value by using the following formula. Further, whether the tape sticked to the stainless steel pole was considered.

$$\mu = (1/\pi)\ln(T_1/T_2)$$

Measurement of still durability

Still durability was evaluated in the following manner.

A pose button was pushed during the reproduction of an image with an eight mm-VTR ("FUJIX-8 M6 type" manufactured by Fuji Photo Film Co., Ltd. (from which a function for restricting still reproduction time being removed)), and the time elapsed until the image disappeared was measured to make the evaluation.

Measurement of corrosion resistance

Aerosol of 15 wt. % brine was sprayed on the ferromagnetic thin metal film of the magnetic recording medium sample for 3 minutes, and the sample was allowed to stand in an atmosphere of 60° C. and 80% RH for 2 days. The surface of the ferromagnetic thin metal film after standing was observed with the naked eye and through a optical microscope (of 50 magnifications). Evaluation was made from the degree of the formation of rust in the following grade.

1: The formation of rust could be observed almost over the whole surface of the film (the naked eye).
2: The formation of rust could be observed with the naked eye.
3: The formation of rust could not be observed with the naked eye, but the formation of rust could be observed when the observation was made through the optical microscope.
4: The formation of rust could not be observed with the naked eye, but the formation of rust could be somewhat observed when the observation was made through the optical microscope.
5: The formation of rust could not be observed with the naked eye and could scarcely be observed through the optical microscope.
6: No formation of rust could be observed through the optical microscope.

EXAMPLE 2

The web film (roll) 301 of the magnetic recording medium obtained in Example 1 was treated in a heat treating apparatus of FIG. 5.

The magnetic recording medium 301 was conveyed along the heating roller 306 as shown in FIG. 5 so as to allow the ferromagnetic thin metal film to be outward positioned. The magnetic recording medium was conveyed at a constant speed of 10 m/min. The heating roller 306 was made of aluminum and had an outer diameter of 200 mm. A cover layer 311 comprising polyfluoroethylene of 30 μm in thickness ("Teflon" manufactured by Du Pont) was uniformly provided on the surface of the roll, said surface being in contact with the magnetic recording medium 301.

The surface temperature of the heating roller 306 was set to 115° C. The surface temperature was measured by pressing the terminal of a contact thermometer against the surface of the heating roll 306. The wrapping angle of the magnetic recording medium 301 around heating roller 306° was 250° C.

A heat-treated web film was obtained by the above-described treatment.

In FIG. 5, other numerals represent the following members.
302: delivery base film.
303: delivery shaft
304: bobbin
305: pass roll
307: pass roll
308: winding machine
309: bobbin A solution of each lubricant given in Table 2 dissolved in a solvent ZS100 was coated on the ferromagnetic thin web film of the heat-treated web film in such an amount as to give a coating weight given in Table 2. The coated sample was dried and slit into films 8 mm in width. The sample Nos. 9 to 14 were prepared.

In the same manner as in Example 1, the resulting magnetic tapes were tested to examine saturation adsorption amount, the coefficient of friction (μ value) of each tape against a stainless steel pole under conditions (A) (50° C., 90% RH) and (B) (5° C., 15% RH), repeated running durability and still durability by using an eight mm-VTR, jitter and the degree of corrosion resistance. The results are shown in Table 2.

TABLE 2

| Sample No. | Perfluoropolyether having polar group | Coating weight (mg/m²) | Saturation adsorption amount (mg/m²) | Coefficient of friction Condition A | Coefficient of friction Condition B | Sticking Condition A | Sticking Condition B | Jitter/μs | Still durability Condition A | Still durability Condition B | Corrosion resistance |
|---|---|---|---|---|---|---|---|---|---|---|---|
| 9 | Compound 1 | 5 | 5.7 | 0.2 | 0.21 | not sticked | not sticked | 0.11 | at least 60 min | at least 60 min | 5 |
| 10 | Compound 1 | 15 | 5.7 | 0.21 | 0.21 | not sticked | not sticked | 0.12 | at least 60 min | at least 60 min | 5 |
| 11 | Compound 2 | 10 | 5.3 | 0.22 | 0.23 | not sticked | not sticked | 0.13 | at least 60 min | at least 60 min | 5 |
| 12 (Comp.) | Compound 6 | 15 | 3.5 | 0.31 | 0.37 | sticked | sticked | 0.45 | at least 60 min | 40 min | 3 |
| 13 (Comp.) | Compound A (shown | 5 | 0.1 | at least 0.6 | at least 0.6 | sticked | sticked | could not be measured | 12 min | 6 min | 1 |

TABLE 2-continued

| Sample No. | Per-fluoro-polyether having polar group | Coating weight (mg/m²) | Saturation adsorption amount (mg/m²) | Coefficient of friction Condition A | Coefficient of friction Condition B | Sticking Condition A | Sticking Condition B | Jitter/ μs | Still durability Condition A | Still durability Condition B | Corrosion resistance |
|---|---|---|---|---|---|---|---|---|---|---|---|
| 14 (Comp.) | in Table 1) Omitted | 0 | — | at least 0.6 | at least 0.6 | sticked | sticked | could not be measured | 1 min or below | 1 min or below | 1 |

TABLE 3

| Sample No. | Per-fluoro-polyether having polar group | Coating weight (mg/m²) | Saturation adsorption amount (mg/m²) | Coefficient of friction Condition A | Coefficient of friction Condition B | Sticking Condition A | Sticking condition B | Jitter/ μs | Still durability condition A | Still durability condition B | Corrosion resistance |
|---|---|---|---|---|---|---|---|---|---|---|---|
| 15 | Compound 3 | 5 | 4.5 | 0.23 | 0.23 | not sticked | not sticked | 0.15 | at least 60 min | at least 60 min | 5 |
| 16 | Compound 1 | 15 | 4.7 | 0.22 | 0.23 | not sticked | not sticked | 0.13 | at least 60 min | at least 60 min | 5 |
| 17 | Compound 2 | 10 | 4.2 | 0.24 | 0.25 | not sticked | not sticked | 0.18 | at least 60 min | at least 60 min | 5 |
| 18 (Comp.) | Compound 8 | 10 | 2.8 | 0.36 | 0.41 | sticked | sticked | 0.65 | 34 min | 29 min | 2 |
| 19 (Comp.) | Compound B (shown in Table 1) | 15 | 1.8 | 0.43 | 0.52 | sticked | sticked | 0.75 | 26 min | 23 min | 1 |
| 20 (Comp.) | Omitted | 0 | — | at least 0.6 | at least 0.6 | sticked | sticked | could not be measured | 1 min or below | 1 min or below | 1 |
| 21 (Comp.) | Compound C | 2.5 | 1.3 | 0.44 | 0.58 | sticked | sticked | 0.79 | 23 min | 19 min | 1 |

Compound C (Comp.)
$F(C_3F_6O)C_2F_4COOCH_3$

As is apparent from the results of Tables 2 and 3, the relationship between the saturation adsorption amount and the coefficient of friction, jitter, still durability or corrosion resistance are graphically represented in FIGS. 8 to 11.

EXAMPLE 3

Figure 7:
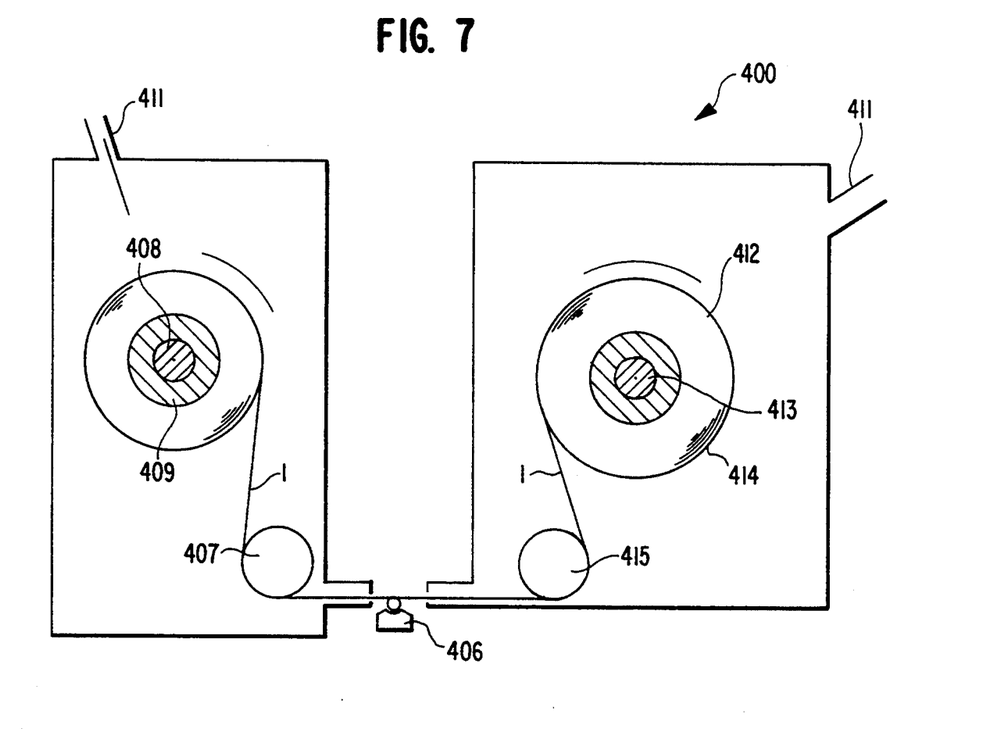
FIG. 7 is a cross-sectional view of a treating device for treating ferromagnetic thin metal film with an inert gas.
Figure 8:
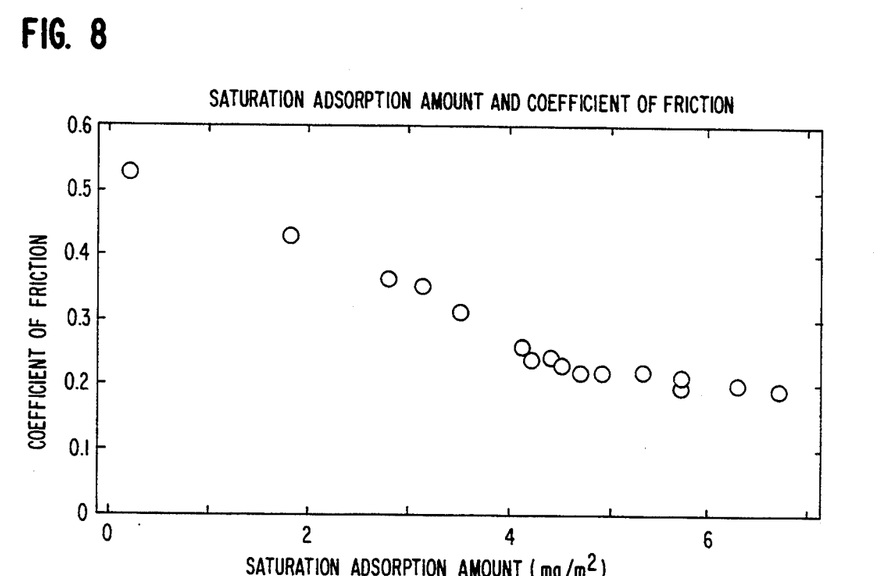
FIG. 8 is a graph showing the relationship between the saturation adsorption amount of the perfluoropolyether having at least one polar group adsorbed on the ferromagnetic thin metal film and the coefficient of friction of the ferromagnetic thin metal film.
Figure 9:
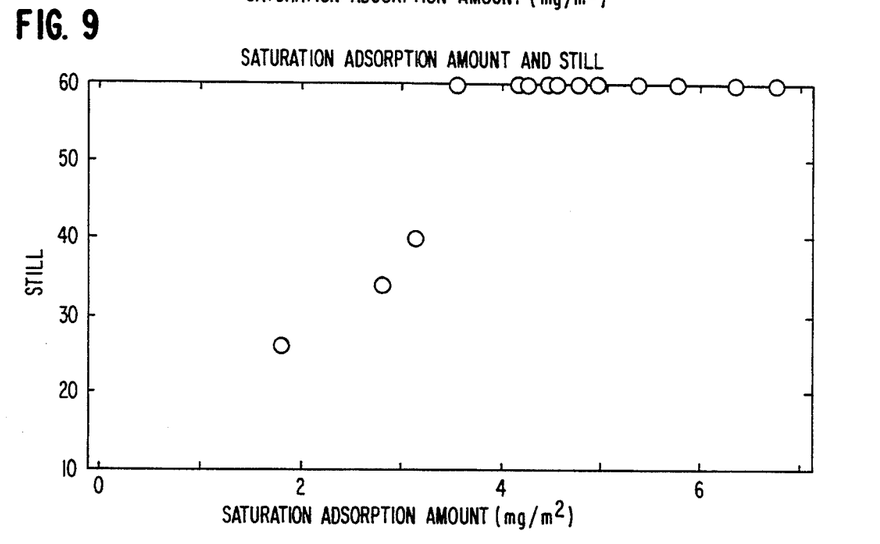
FIG. 9 is a graph showing the relationship between the saturation adsorption amount of the perfluoropolyether having at least one polar group adsorbed on the ferromagnetic thin metal film and the still properties of the ferromagnetic thin metal film type magnetic recording medium.
Figure 10:
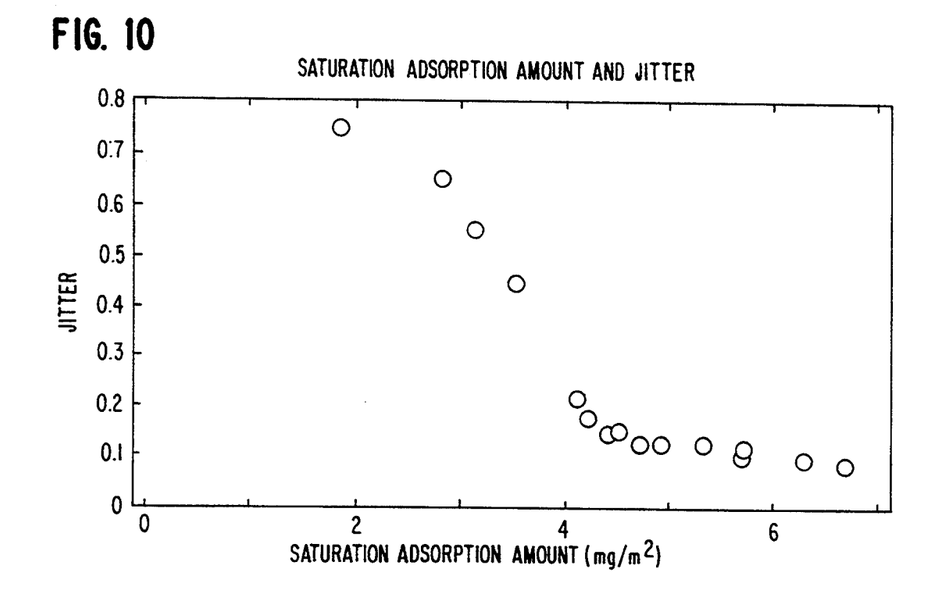
FIG. 10 is a graph showing the relationship between the saturation adsorption amount of the perfluoropolyether having at least one polar group adsorbed on the ferromagnetic thin metal film and the jitter of the ferromagnetic thin metal film type magnetic recording medium.
Figure 11:
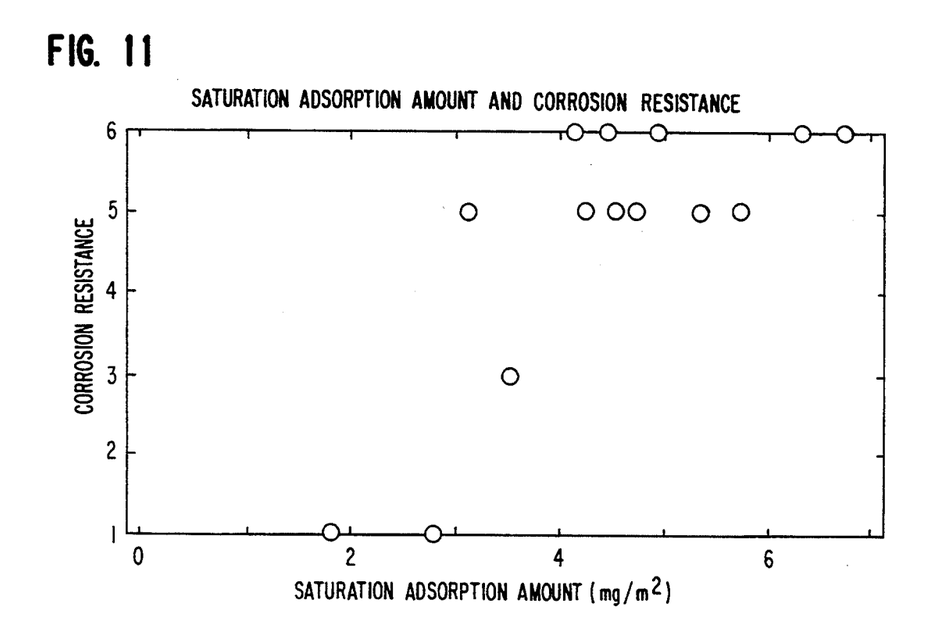
FIG. 11 is a graph showing the relationship between the saturation adsorption amount of the perfluoropolyether having at least one polar group adsorbed on the ferromagnetic thin metal film and the corrosion resistance of the ferromagnetic thin metal film type magnetic recording medium.

A ferromagnetic thin metal film was formed under the same conditions as in Example 1. Nitrogen gas was introduced into a treating apparatus to fill it with inert gas when vacuum was released. The web film roll of the magnetic recording medium was then placed in a closed vessel while the roll was kept out of contact with the air as shown in FIG. 7. A container-to-container connection was set so as to allow the roll to be kept out of contact with the air by pressurizing the take-up side of the closed coater in the treating system with nitrogen gas. The roll was conveyed, and a solution of each lubricant given in Table 3 dissolved in a solvent ZS100 was coated on the ferromagnetic thin metal film in such an amount as to give a coating weight given in Table 3. The coated sample was dried and slit into films 8 mm in width. Thus, Sample Nos. 15 to 20 given in Table 3 were prepared.

In the same manner as in Example 1, the resulting magnetic tapes were tested to examine saturation adsorption amount, the coefficient of friction against a stainless steel pole under conditions (A) (50° C., 70% RH) and (B) (5° C., 15% RH), repeated running durability and still durability by using an eight mm-VTR, jitter and the degree of corrosion resistance. The results are shown in Table 3.

In FIG. 7, the numerals represent the following members.
- 400: closed chamber
- 406: coil bar
- 407: pass roll
- 408: take-up shaft
- 409: bobbin
- 411: inert gas introducing port
- 412: delivery base film
- 413: delivery shaft
- 414: bobbin
- 415: pass roll

COMPARATIVE EXAMPLE

A ferromagnetic thin metal film was formed under the same conditions as those of Example 1. Vacuum was released to the air. Fluorinated oil ("Fombrin Z-DEAL", the following compound C manufactured by Nippon Montedison) was coated on the ferromagnetic thin metal film. The coated sample was heat-treated at 60° C. for 24 hours, dried and slit into films 8 mm in width to prepare a sample No. 21.

Compound C $$F(C_3F_6O)C_2F_4COOCH_3$$

It is understood from the above disclosure that when the perfluoropolyether having at least one polar group is applied to the surface of the ferromagnetic thin metal film, the saturation adsorption amount thereof adsorbed by the ferromagnetic thin metal film being at least 4.0 mg/m², the obtained thin metal film type magnetic recording medium which has excellent running durability under wide environmental conditions as well as excellent corrosion resistance against salt damage. It is particularly effective for obtaining the ferromagnetic thin metal film having excellent electromagnetic characteristics that the ferromagnetic thin metal film comprises Co as a main component and has an oxygen content of at least 15 at. %, and the perfluoropolyether has at least one polar group selected from the group consisting of an oxo acid group, a sulfo group, a sulfoxide group and a diphenyl ether group.

It is further effective if after forming the ferromagnetic thin metal film, the surface thereof is treated in ozone gas.

While the present invention has been described in detail and with reference to specific embodiments thereof, it is apparent to one skilled in the art that various changes and modifications can be made therein without departing from the spirit and the scope of the present invention.

What is claimed is:

1. A method for preparing a ferromagnetic thin metal film type magnetic recording medium comprising the steps of:
   depositing a metal vapor stream comprising Co as a main component on a non-magnetic support in an oxygen gas-containing atmosphere to form a ferromagnetic thin metal film, wherein said ferromagnetic thin metal film has an oxygen content of at least 15 at. %;
   exposing the ferromagnetic thin metal film to ozone; and then
   applying a perfluoropolyether having at least one polar group to the ferromagnetic thin metal film; wherein said perfluoropolyether having at least one polar group has a saturation adsorption amount (mg/m²) of at least 4.0 mg/m² against said ferromagnetic thin metal film.

2. A method for preparing a ferromagnetic thin metal film type magnetic recording medium as claimed in claim 1, wherein said perfluoropolyether has at least one polar group selected from the group consisting of an oxo acid group, a sulfo group, a sulfoxido group and a diphenylether group.

3. A method for preparing a ferromagnetic thin metal film type magnetic recording medium as claimed in claim 1, wherein said ferromagnetic thin metal film is exposed to an ozone gas-containing atmosphere at a temperature of from 80° C. to 140° C.

4. A method for preparing a ferromagnetic thin metal film type magnetic recording medium comprising the steps of:
   depositing a metal vapor stream comprising Co as a main component on a non-magnetic support in an oxygen gas-containing atmosphere to form a ferromagnetic thin metal film, wherein said ferromagnetic thin metal film has an oxygen content of at least 15 at. %;
   treating the ferromagnetic thin metal film by holding it in an inert gas; and then
   applying a perfluoropolyether having an oxo acid group as a polar group to the ferromagnetic thin metal film; wherein said perfluoropolyether having an oxo acid group as a polar group has a saturation adsorption amount (mg/m²) of at least 4.0 mg/m² against said ferromagnetic thin metal film.

5. A method for preparing a ferromagnetic thin metal film type magnetic recording medium comprising the steps of:
   depositing a metal vapor stream comprising Co as a main component on a non-magnetic support in an oxygen gas-containing atmosphere to form a ferromagnetic thin metal film, wherein said ferromagnetic thin meal film has an oxygen content of at least 15 at. %;
   holding the ferromagnetic thin metal film at a temperature of 100° to 160° C. for 1 to 60 seconds for heat-treatment; and then
   applying a perfluoropolyether having at least one polar group to the ferromagnetic thin metal film; wherein said perfluoropolyether having at least one polar group has a saturation adsorption amount (mg/m²) of at least 4.0 mg/m² against said ferromagnetic thin metal film.

6. A method for preparing a ferromagnetic thin metal film type magnetic recording medium as claimed in claim 5, wherein said perfluoropolyether has at least one polar group selected from the group consisting of an oxo acid group, a sulfo group, a sulfoxido group and a diphenylether group.

* * * * *